J. GAMBEL.
OIL STOVE.
APPLICATION FILED SEPT. 13, 1915.

1,177,945.

Patented Apr. 4, 1916.

WITNESS
Frank H Fowler

INVENTOR
John Gambel
BY
Fred P. Gorin
ATTORNEY

THE COLUMBIA PLANOGRAPH CO., WASHINGTON, D. C.

UNITED STATES PATENT OFFICE.

JOHN GAMBEL, OF SEATTLE, WASHINGTON.

OIL-STOVE.

1,177,945.  Specification of Letters Patent.  Patented Apr. 4, 1916.

Application filed September 13, 1915. Serial No. 50,513.

*To all whom it may concern:*

Be it known that I, JOHN GAMBEL, a citizen of the United States, and a resident of Seattle, in the county of King and State of Washington, have invented certain new and useful Improvements in Oil-Stoves, of which the following is a full, true, and exact specification.

My invention relates to oil stoves and has for its principal object to generally improve upon the ordinary oil heating stove in that I provide novel means for converting the heating stove into one upon which cooking vessels may be heated.

A further object is to provide an improved and novel device for supporting a cooking vessel which is smaller in diameter than the said stove, the said device being removable from the stove but it may also be left in the stove if desired.

Still a further object is to provide a device for supporting a vessel larger in diameter than the stove.

Other objects will appear as my invention is more fully explained in the following specification, illustrated in the accompanying drawings and pointed out in the appended claims.

Figures 2, 3, 4:
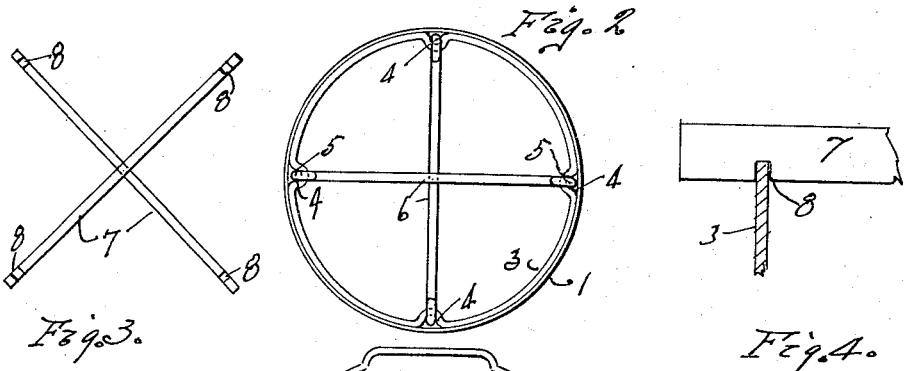
Figure 1:
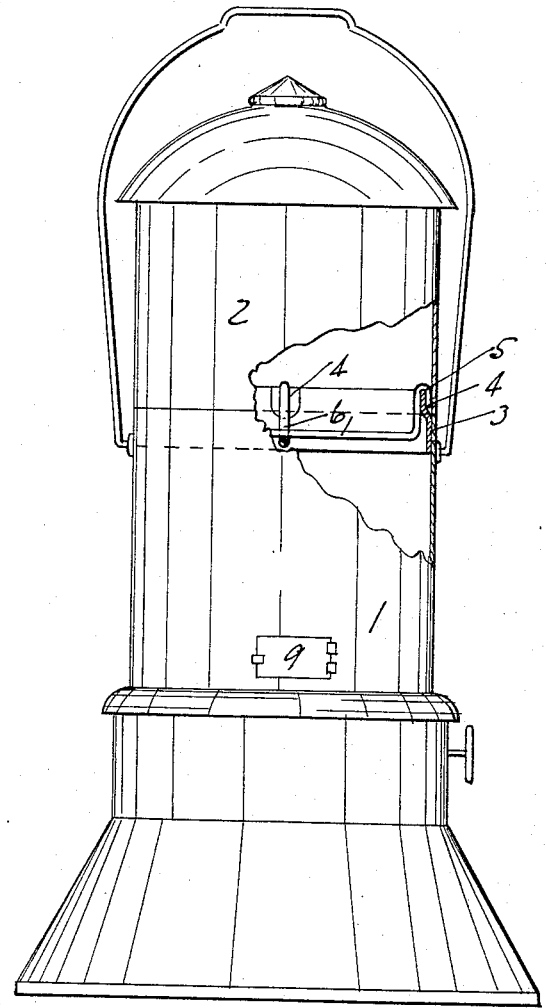

In the drawings, Figure 1 is an elevation of my oil stove with parts broken away and showing one of my kettle supports in place. Fig. 2 is a plan view of the lower half of Fig. 1. Fig. 3 is a detail plan of a large kettle support. Fig. 4 is an enlarged fragmentary elevation of a part of Fig. 3.

Referring more particularly to the drawings, numeral 1 indicates the lower portion of an oil stove and 2 the upper portion which are usually integral in an ordinary oil stove. I build my stove in the two sections mentioned so that the top 2 may be removed when the stove is to be used for cooking purposes. A sleeve 3 holds the two sections in line and serves to support the kettle supports. Sleeve 3 has pockets 4 pressed in its periphery within which the bent down ends 5 of a small kettle support rest. The kettle support is depressed centrally so as to fit down within the sleeve 3 and consists of a radially connected grid 6. It will be understood that the heating effect is greater when the kettle is set down into the section sleeve 3 than when supported above. The small kettle support does not interfere with the placing of the top section 2 and may be left in place.

For large kettles, the support shown in Figs. 3 and 4 is used and includes a pair of joined and crossed bars 7 which are notched as at 8 to fit onto the top of the sleeve 3 in such a way as to stay in place and leave a draft space around the kettle and above the sleeve 3. A lighting door 9 is provided in section 1 which permits of the stove being lighted without removing the kettles.

While I have shown a particular form of embodiment of my invention, I am aware that many minor changes therein will readily suggest themselves to others skilled in the art without departing from the spirit and scope of the invention, and I therefore desire to avoid being limited to the exact form shown and described except as pointed out in the appended claims.

Having described my invention, what I claim as new and desire to protect by Letters Patent, is—

1. In an oil stove having a separable upper portion, the combination of a sleeve secured to the said stove and adapted to fit slidably within said upper portion, and a depressed grid adapted to fit down inside of the sleeve and to be supported by said sleeve, whereby a cooking vessel of less diameter than the grid, may be supported.

2. In an oil stove having a separable upper portion, the combination of a sleeve secured to the said stove and adapted to fit slidably within said upper portion, recessed pockets equally spaced around the upper periphery of said sleeve, and a depressed grid adapted to fit down inside of the sleeve and to be supported by turned down projections on said grid which fit into the said pockets in said sleeve, whereby a cooking vessel of less diameter than the grid may be supported.

JOHN GAMBEL.

Copies of this patent may be obtained for five cents each, by addressing the "Commissioner of Patents, Washington, D. C."